(12) United States Patent
Davidson (10) Patent No.: US 6,632,464 B2
(45) Date of Patent: *Oct. 14, 2003

(54) METHOD FOR PRODUCTION OF PASTEURIZED IN-SHELL CHICKEN EGGS

(76) Inventor: Leon John Davidson, Fells #3, S. Down Shores, R.R. #11, Box 1A2, Parade Rd., Laconia, NH (US) 03246-9315

( * ) Notice: Subject to any disclaimer, the term of this patent is extended or adjusted under 35 U.S.C. 154(b) by 0 days.

This patent is subject to a terminal disclaimer.

(21) Appl. No.: 09/976,106

(22) Filed: Oct. 15, 2001

(65) Prior Publication Data

US 2002/0039618 A1 Apr. 4, 2002

Related U.S. Application Data

(62) Division of application No. 09/613,832, filed on Jul. 11, 2000, now Pat. No. 6,322,833, which is a division of application No. 09/197,573, filed on Nov. 23, 1998, now Pat. No. 6,165,538, which is a division of application No. 08/962,766, filed on Nov. 3, 1997, now Pat. No. 5,843,505, which is a continuation of application No. 08/519,184, filed on Aug. 25, 1995, now abandoned.

(51) Int. Cl.[7] ............................. A23B 5/005; A23L 1/28

(52) U.S. Cl. ..................... 426/298; 426/614; 426/300; 426/231; 426/521

(58) Field of Search ................................ 426/614, 298, 426/300, 231, 521

(56) References Cited

U.S. PATENT DOCUMENTS

| | | |
|---|---|---|
| 709,583 A | 9/1902 | Schoning |
| 1,092,897 A | 4/1914 | Clairemont |
| 1,163,873 A | 12/1915 | Thornburgh |
| 1,197,707 A | 9/1916 | Bennett |
| 1,388,024 A | 8/1921 | Clairemont et al. |
| 1,888,415 A | 11/1932 | Swenson |
| 1,922,143 A | 8/1933 | Sharp |
| 2,001,628 A | 5/1935 | Nierinck |
| 2,184,063 A | 12/1939 | Meyer et al. |
| 2,236,773 A | 4/1941 | Fischer |
| 2,423,233 A | 7/1947 | Funk |
| 2,497,817 A | 2/1950 | Hale et al. |
| 2,565,311 A | 8/1951 | Koonz et al. |
| 2,673,160 A | 3/1954 | Feeney et al. |
| 2,758,935 A | 4/1956 | Shaffer |
| 2,776,214 A | 1/1957 | Lloyd et al. |
| 3,028,245 A | 4/1962 | Mink et al. |
| 3,082,097 A | 3/1963 | Haller |

(List continued on next page.)

FOREIGN PATENT DOCUMENTS

| | | |
|---|---|---|
| NL | 72454 | 4/1953 |
| WO | 9514388 | 6/1995 |
| WO | 9518538 | 7/1995 |

OTHER PUBLICATIONS

Database Abstract. Derwent Acc. No. 1983–813753 for SU 2935002, published Jun. 2, 1980. Inventors: Ayunov et al.*
Univ. of Missouri, Research Bulletin 362, pp. 1–37, "Stabilizing Quality in Shell Eggs," E. M. Funk, Apr. 1, 1943.
Univ. of Missouri, Research Bullentin 364, pp. 1–28, "Pasteurization of Shell Eggs," E. M. Funk, Apr. 27, 1943.
Univ. of Missouri, Research Bulletin 467, pp. 1–46, "Maintenance of Quality in Shell Eggs By Thermostabilization," E. M. Funk, Dec. 29, 1950.

*Primary Examiner*—Anthony J. Weier
(74) *Attorney, Agent, or Firm*—Kenyon & Kenyon (57) ABSTRACT

A method of pasteurizing in-shell chicken eggs by heating eggs until a central portion of the yolks of the eggs is at a temperature between 128° F. to 138.5° F. That temperature is maintained and controlled for times within parameter line A and parameter line B of FIG. 1 and sufficient that any Salmonella species present in the yolk is reduced by at least 5 logs but insufficient that an albumen functionality of the egg measured in Haugh units is substantially less than the albumen functionality of a corresponding unpasteurized in-shell egg.

5 Claims, 1 Drawing Sheet

U.S. PATENT DOCUMENTS

| | | |
|---|---|---|
| 3,113,872 A | 12/1963 | Jones et al. |
| 3,144,342 A | 8/1964 | Collier et al. |
| 3,148,649 A | 9/1964 | Moore et al. |
| 3,364,037 A | 1/1968 | Mink et al. |
| 3,522,061 A | 7/1970 | Whiteford |
| 3,658,558 A | 4/1972 | Rogers et al. |
| 4,524,082 A | 6/1985 | Liot |
| 4,524,083 A | 6/1985 | Liot |
| 4,808,425 A | 2/1989 | Swartzel et al. |
| 5,589,211 A * | 12/1996 | Cox et al. |
| 5,843,505 A * | 12/1998 | Davidson |
| 6,322,833 B1 * | 11/2001 | Davidson |

* cited by examiner

METHOD FOR PRODUCTION OF PASTEURIZED IN-SHELL CHICKEN EGGS

This application is a divisional of application Ser. No. 09/613,832, filed on Jul. 11, 2000, now U.S. Pat. No. 6,322,833, which is a divisional of application Ser. No. 09/197,573, filed on Nov. 23, 1998, now U.S. Pat. No. 6,165,538, which is a divisional of application Ser. No. 08/962,766, filed on Nov. 3, 1997, now U.S. Pat. No. 5,843,505, which application is a continuation of application Ser. No. 08/519,184, filed Aug. 25, 1995, now abandoned, the entire contents of each application are hereby incorporated by reference.

The present invention relates to pasteurized in-shell chicken eggs and to a method for production thereof, and, more particularly, to such eggs and method where certain pathogens whenever present in the eggs are reduced in quantity to a level safe for human consumption while at the same time the functionality of the eggs is preserved, particularly the albumen functionality, such that the pasteurized eggs are substitutable for fresh, unpasteurized eggs in most consumption uses.

BACKGROUND OF THE INVENTION

The term pasteurization is used herein in connection with the present invention in the general sense that the term is applied to other food products, e.g. pasteurized milk, in that the present pasteurized eggs are partially sterilized at temperatures which destroy objectionable microorganisms, without major changes in the functionality of the eggs. In this regard, food products are conventionally heated at temperatures and for times so as to sufficiently destroy pathogenic microorganisms, which may be contained in the food, so that the pasteurized food is safe for human consumption. In order to provide a pasteurized food safe for human consumption, it is not necessary that all pathogenic microorganisms in the food be destroyed, but it is necessary that those pathogenic microorganisms be reduced to such a low level that the organisms cannot produce illness in humans of usual health and condition. For example, fresh whole milk may contain virulent pathogenic microorganisms, most notably microorganisms which cause tuberculosis in humans, and during pasteurization of the milk, those pathogenic microorganisms are reduced to such low levels that the milk is safe for consumption by humans of ordinary health and condition. In the case of some microorganisms, however, usual pasteurization temperatures and times can completely destroy those microorganisms. Milk so pasteurized does not have major changes in the functionality thereof. The taste and texture of pasteurized milk is slightly changed, but those changes are not of practical significance to most consumers thereof.

Heat destruction of microorganisms in eggs has long been known in that the eggs were cooked sufficiently to effect destruction thereof. For example, when frying an egg, fried to a reasonable hardness, microorganism destruction will occur. Likewise, when boiling an egg to a hard-boiled state, heat destruction of microorganisms in the egg will occur. However, with these cooking processes, major changes in the functionality of the egg occurs, e.g. coagulation of the yolk and white, and, thus, this is not pasteurization in the usual sense, as explained above.

Recently, pasteurization of liquid chicken eggs (eggs out of the shell) has been commercially practiced. The process, very basically, involves heating liquid chicken eggs for short times at higher temperatures to reduce any pathogenic microorganisms therein such that the pasteurized liquid chicken eggs are safe for human consumption, while, at the same time, major changes in functionality do not occur. See, for example, U.S. Pat. No. 4,808,425.

However, the art has long since struggled with pasteurizing in-shell chicken eggs. While in-shell eggs may be heated sufficiently to destroy microorganisms, the art has not, at the same time, been able to substantially retain the functionality of the eggs. The functionality is determined by various tests, but a more basic test is that of the albumen functionality, which test measures the whipped volume, under standard conditions, of whipped liquid albumen, as measured in Haugh units.

In the case of liquid chicken eggs (not in the shell), by careful control of the time and temperature of heating the liquid eggs, usually with a short time, high temperature (HTST) apparatus, pasteurization can be achieved while retaining, at least substantially, the functionality of the eggs. This is particularly true when the liquid eggs are heated for pasteurization purposes in a very thin film, where the temperature and time of heating of the liquid eggs can be very carefully controlled.

In liquid eggs, the yolk may or may not be mixed with the albumen. As can be appreciated, however, with in-shell chicken eggs (also referred to as "shell eggs"), not only is the mass of the egg substantially different from the mass of a unit of thin film of liquid eggs, but the yolk is essentially centrally positioned in the shell. Accordingly, while the art has struggled for some time to carefully control temperatures and times for pasteurizing in-shell eggs, none of those efforts in the art have been successful in terms of both reducing pathogenic microorganisms found in chicken eggs to a level safe for human consumption while maintaining essentially the same functionality of the eggs as unpasteurized eggs. As a result, no commercial process for pasteurizing in-shell eggs and no commercial pasteurized in-shell eggs have been available.

The art has taken many different approaches in attempts to pasteurize in-shell eggs. See, for example, U.S. Pat. Nos. 1,163,873; 2,423,233; 2,673,160; and 3,658,558. The more prevalent approaches involve heating the in-shell eggs, usually in a water bath, for various times and at various temperatures, as specified by the various investigators in the art. These times and temperatures specified by the various investigators vary widely, and this is because all of those approaches involve a compromise either in the degree of safety achieved or in the quality of the functionality retained.

In this latter regard, if the in-shell egg is heated in a water bath, where the water bath temperature and time of heating are specified by the investigator, one of two results have generally occurred. The first result is that, when higher temperatures and longer times are specified, while the egg may be acceptably reduced in microorganism content, the functionality of the egg is also considerably reduced, such that the egg is no longer substitutable for unpasteurized eggs in either usual home cooking, e.g. frying, or in conventional baking recipes. The other result, when using lower temperatures of the water bath and shorter times, while the functionality of the egg is substantially maintained, the decrease in pathogenic microorganisms, which may be present in the eggs, is severely compromised, and the egg may be safer but not be safe for human consumption. While eggs processed according to this latter approach can be said to be safer to eat, in that there is some reduction of pathogenic microorganisms in the eggs, the eggs are not pasteurized in the sense as set forth above, i.e. that they are safe for consumption by humans of ordinary health and condition.

Faced with the above difficulties, that art searched for intermediate water bath temperatures and dwell times where functionality of the egg is preserved and microorganisms are substantially reduced. Unfortunately, these searches have generally resulted in the worst of both of the results noted above, i.e. both reduced functionality of the egg and still insufficient reduction in microorganisms, which result is less desirable than either of the two above-noted general results.

Accordingly, therefore, the art has been on the horns of a dilemma, i.e. if the times of dwell and temperatures of the water bath are high enough to substantially reduce the microorganism content of in-shell eggs, then the functionality of the eggs is substantially reduced, while if the times of dwell and temperatures of the water bath are sufficiently low as to substantially maintain the functionality of the eggs, the eggs are not sufficiently reduced in microorganism content so as to be pasteurized.

Pathogenic microorganisms are introduced into chicken eggs by two principal routes. Firstly, pathogens are introduced into the in-shell eggs from environmental contamination. This environmental contamination may occur through a variety of causes, but typically, infected chickens or mice in commercial egg-laying chicken houses deposit feces which contact the shell of a laid egg. Certain microorganisms, especially Salmonella, when in contact with the shell of the egg, can penetrate that shell, especially through small fissures or pores in the shell. That contamination is, therefore, from the outside of the shell into the egg, and the contamination remains, largely, in the albumen near the shell. This contamination can be very substantially reduced by the above-noted approaches of the prior art, since, when the egg is placed in a water bath heated to the temperatures suggested by the art, this is sufficient to heat the albumen near the shell and substantially destroy pathogens which may have penetrated the shell from environmental contamination. In this sense, the egg is, indeed, safer to eat.

The second route of contamination in the eggs is systemic, and this poses a far more difficult problem. Typically, feces of infected chickens or mice are ingested by the chicken during feeding, and that infection becomes systemic in the chicken. Certain organisms, very notably *Salmonella enteritidis*, enter the bloodstream of the chicken and pass, trans-ovarially, into the interior of the egg itself. Most especially, that systemic contamination occurs in the yolk of the egg, although that contamination can also easily extend into the albumen. In this type of contamination, the prior art approaches, as noted above, are ineffective toward substantially reducing microorganisms in the eggs, including the yolk, while at the same time maintaining the functionality of the eggs.

While many suggestions have been made in the prior art, principally, a water bath is heated to specified temperatures (although air, oil and the like heat transfer media have been suggested), and the in-shell eggs are then placed in that heated water bath and dwell therein for a specified length of time. It is generally assumed that the yolk temperature will come to equilibrium with the water bath temperature after a sufficiently long dwell time of the eggs. Unfortunately, specifying the temperature of the water bath and the time of dwell of the eggs therein does not necessarily specify temperatures within the eggs, and especially the yolks. This is because eggs can vary in one or more of weight, size, shape, composition (e.g. relative size of yolk and air sack) and density, all of which affects the heat transfer properties of a particular egg in the water bath at the specified temperatures. Thus, when operating in water baths at specified temperatures within specified time ranges, the temperature within a particular egg, and especially the yolk, is entirely problematic, and, hence, the control of the prior art approaches toward pasteurizing eggs, especially in regard to yolk contamination, has been completely inadequate and more or less is a matter of chance—see, for example, WO 95/14388.

The specified temperatures of the water baths in the prior art vary considerably, with some investigators taking the approach of relatively low temperature baths, e.g. as low as about 100° F., with long dwell periods of the eggs, while other investigators took the approach of high temperature baths, e.g. up to 160° F., with relatively short dwell periods of the eggs, and others took an intermediate approach, e.g. 130° F. to 140° F., with intermediate dwell periods, e.g. 50 minutes. However, no matter which of these approaches is adopted, as explained above, the art simply has not found combinations of temperatures of water baths and times of dwell which will ensure eggs safe for human consumption, i.e. pasteurized eggs, including pasteurization of the yolks, while at the same time maintaining the functionality of the eggs. Accordingly, it would be a very substantial benefit to the art to provide a method for pasteurizing eggs where the eggs are not only pasteurized, i.e. safe for consumption by humans of ordinary health and condition, but which also assures that the functionality of the eggs is substantially retained.

BRIEF SUMMARY OF THE INVENTION

Very briefly, the present invention provides pasteurization of an in-shell chicken egg, i.e. safe to eat by humans of ordinary health and condition, by achieving a 5 log reduction of Salmonella species which may be present in the egg by controlling the yolk temperature within relatively narrow limits so that both the pasteurization is achieved and the functionality of the egg is not substantially decreased. In these regards, the present invention is based on several primary discoveries and several subsidiary discoveries.

As a primary discovery, it was found that, if the temperature and dwell time of the yolk is at a certain correlation of temperature and time or within a 95% confidence level deviation, Salmonella species which may be present in the egg yolk, as well as the albumen, can be reduced by at least 5 logs, which reduction is sufficient for true pasteurization, i.e. safe for consumption by humans of ordinary health and condition, while at the same time there is a retention of functionality of the eggs.

As a subsidiary discovery in this regard, it was found that, if Salmonella species are reduced by that at least 5 logs, other microorganisms found in the egg are also reduced, such that the egg is pasteurized in respect to those other microorganisms.

As a second primary discovery, it was found that, if the egg is pasteurized according to that certain correlation, or within the limits of deviations noted above, the albumen functionality of the egg, measured in Haugh units, is not substantially deteriorated, as compared with a corresponding unpasteurized in-shell egg.

As a third primary discovery, it was found that, in order to effectively pasteurize an egg, the yolk temperature of that egg must be controlled within relatively narrow temperature limits.

As a subsidiary discovery in this regard, it was found that the temperature of the yolk must be controlled in a range of from 128° F. to 138.5° F. At temperatures of the yolk below 128° F., adequate pasteurization will not occur. On the other hand, at temperatures of the yolk above 138.5° F., the functionality of the egg substantially decreases.

As a fourth primary discovery, it was found that, within this range of yolk temperatures, the dwell time of the yolk at a selected temperature must be relatively closely correlated to that temperature. If the dwell time is significantly below that correlation, pasteurization will not occur. On the other hand, if the dwell time is significantly above that correlation, then the functionality of the egg is substantially deteriorated.

As a subsidiary discovery in this regard, it was found that the limits of deviation from that correlation which are permissible to achieve both pasteurization and retention of functionality are relatively small. Deviations should be no greater than that which will provide a 95% statistical confidence level of pasteurization. Thus, the limits of deviation from that specific correlation must be carefully observed.

Figure 1:
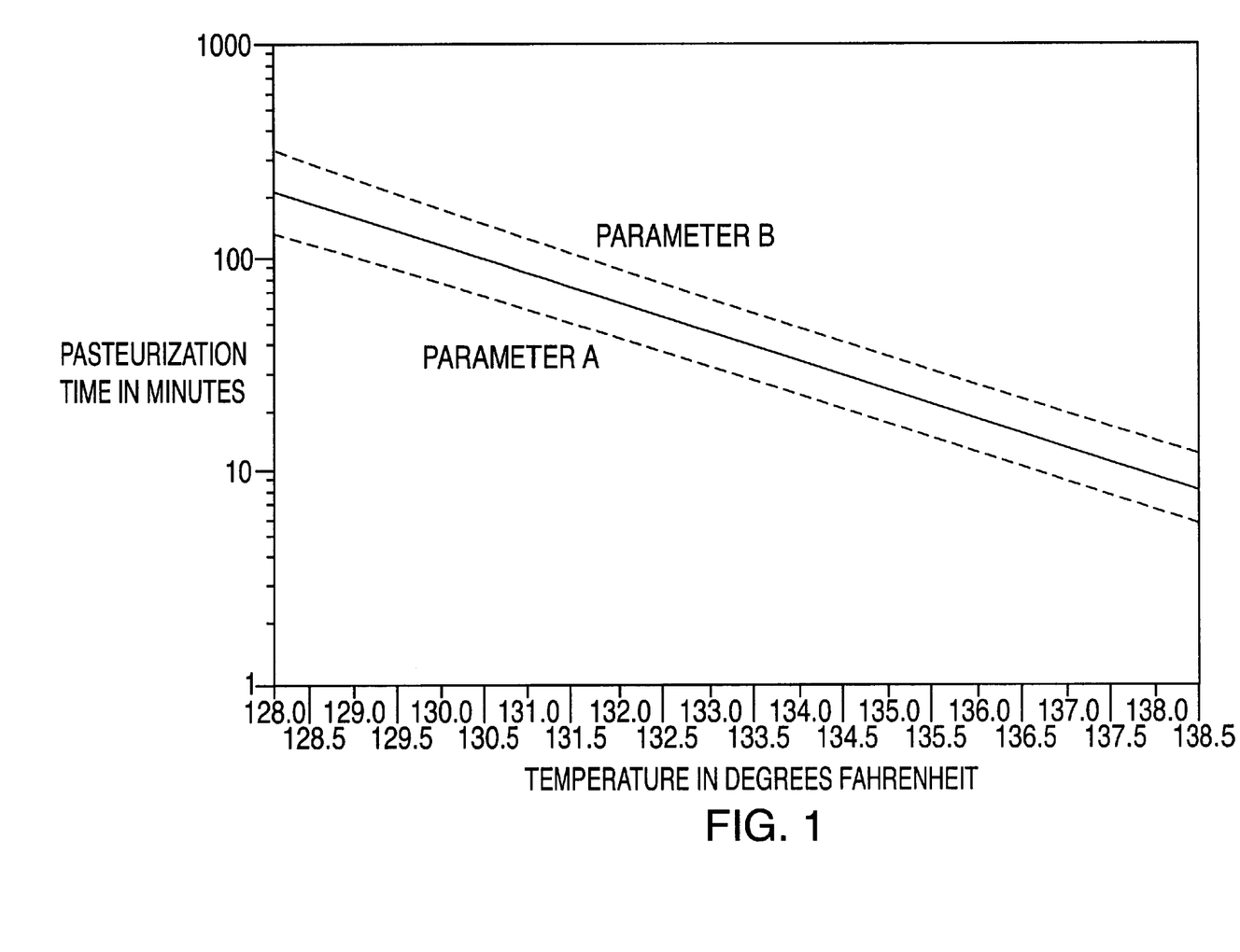
FIG. 1 is a graph showing the required correlation between the temperatures of a central portion of the yolk of an egg during the pasteurization process and the log (base 10) of time at which that central portion of the yolk of the egg dwells at such temperatures. That graph also shows permissible limits of deviation from that correlation, indicated by parameter lines A and B.

Thus, broadly stated, the present invention provides a method of pasteurizing an in-shell chicken egg comprising heating the egg until a central portion of the yolk of the egg is controlled within the range of 128° F. to 138.5° F., and maintaining that controlled yolk temperature for times within parameter line A and parameter line B of FIG. 1 annexed hereto and sufficient that a Salmonella species that may be present in the egg is reduced in amount by at least 5 logs but insufficient that an albumen functionality of the egg measured in Haugh units is substantially less than the albumen functionality of a corresponding unpasteurized in-shell egg.

The invention also provides a pasteurized in-shell chicken egg comprising a pasteurized central portion of a yolk of the egg having at least a 5 log reduction of a Salmonella species that may be present in the yolk in its unpasteurized form. The so-pasteurized egg will have an albumen functionality measured in Haugh units not substantially less that the albumen functionality of a corresponding unpasteurized in-shell egg.

DESCRIPTION OF PREFERRED EMBODIMENTS

The present invention is directed to in-shell chicken eggs, and it cannot be extrapolated to other in-shell poultry eggs. In-shell poultry eggs from different birds vary considerably in the mass, propensity for coagulation of the albumen and yolk, temperatures and dwell times for adequate pasteurization, heat transfer properties, and usual functionalities. For example, it has been found that an in-shell duck egg, which is probably the closest poultry egg to a chicken egg, cannot be pasteurized to a 5 log cycle reduction of a Salmonella species found in chicken eggs and maintain functionality with the method of the present invention. In attempts to pasteurize in-shell duck eggs by this method, it was found that the time and temperature correlations found for in-shell chicken eggs were inappropriate for in-shell duck eggs. Therefore, it is emphasized that the invention relates only to in-shell chicken eggs, and the method of the invention cannot be considered workable to any other in-shell poultry egg. See Dutch Patent No. 72,454.

As opposed to the prior art, briefly summarized above, which relied upon the temperature of the medium for heating the egg, e.g. usually water, the present invention relies upon the temperatures of the yolk of the egg, along with the correlated dwell times of the yolk at those temperatures, and for this reason, the particular medium in which the egg is heated is not critical, as opposed to that of the prior art. Thus, in the prior art, since, generally speaking, the temperature of the heating medium was controlled and the temperature of the yolk was essentially uncontrolled, the choice of heating medium was a critical choice because the heat transfer properties of a particular medium greatly influenced the results of the process. For that reason, most of the approaches in the prior art chose water as the heating medium, since the temperature of the water in a heating bath could be carefully controlled, and heat transfer from the water bath to the egg is accelerated. The present invention does not rely on controlling the temperature of the heating medium to effect pasteurization. Conversely, the present invention relies on controlling the temperature of the yolk. Thus, the heating medium of the present invention can vary widely. The egg can be heated with any fluid heat transfer medium or it can be heated by direct heat from heat sources, such as radiant heaters, infrared heaters, or radiation, such as microwaves. However, since all of those direct heating means require special care in ensuring that the direct heat uniformly heats all surfaces of the egg, it is preferred that the heating medium is a fluid heat transfer medium, since the fluid can be caused to flow around the egg and ensure uniform heating along all surfaces of the shell of the egg. The fluid medium may be any gas, e.g. air, nitrogen, carbon dioxide, etc., but it is preferred that the fluid medium be an aqueous medium, since heat transfer from aqueous mediums is easy to control. Thus, the aqueous medium may be in the form of water vapor, but, more preferably, the aqueous medium is liquid water. Mixtures or sequences of heating medium may also be used, e.g. water and then air.

However, liquid water does have a disadvantage in that, as is well known, during heating in liquid water, gases nucleate on the shell of the egg. This can be observed by anyone boiling an egg in a pot. The nucleated gases decrease the heat transfer between the liquid water and the shell of the egg and, hence, into the interior of the egg. Since this decrease in heat transfer may not be uniform throughout the area of nucleated gases on the shell of the egg, it is most preferable to avoid or displace those nucleated gases to the extent possible. This may be done by adding a surface active agent to the water, e.g. a food-grade ionic, anionic or non-ionic surface active agent, many of which are known in the art, for example, the Tweens. Usually only a fraction of a percent of surface active agent is necessary, e.g. one half of one percent based on the weight of the water, although the surface active agent can be as low as one hundredth of a percent and as high as three or four percent.

Alternatively, the nucleated gases may be displaced from the shell of the egg when at least one of the water and the egg is in motion relative to the other. Thus, the water may be sprayed onto the egg, which keeps the water in motion relative to the egg, or the egg may pass through a substantially continuous curtain of flowing water, or in a water bath, the water may be fully circulated over the egg. In addition, in any of the above cases, the egg may be rotated on a support, and supports for rotating eggs are well known in the art. Alternatively, both motion of the water and the egg can be used, along with a surfactant (non-foaming surfactant) to minimize or avoid inconsistent heat transfers due to nucleated gases.

As noted above, the present invention relies on controlling the temperature and dwell time of the yolk of the egg. However, within the entire yolk, the temperatures thereof may vary, depending upon the proximity of a particular portion of the yolk to the shell and the proximity of the particular portion of the yolk to the center of the yolk. As will be explained hereinafter in detail, the present method is carried out by controlling the temperature of the yolk at a central portion thereof. The center of the yolk, of course, is a theoretical point and modern temperature-measuring devices are not capable of measuring temperatures at a theoretical point. However, such devices are capable of measuring temperatures in a central portion of the yolk, consistent with the width of a modern temperature-measuring probe, e.g. thermocouple. Thus, in the present specification and claims, the central portion of the yolk is defined to mean that portion of the yolk substantially surrounding the center of the yolk which has sufficient volume to accommodate and receive a conventional temperature-measuring probe.

As noted above, it has been found that the temperature of the yolk must be in the range of 128° F. to 138.5° F. While pasteurization can be achieved with yolk temperatures as low as 126° F., this temperature is near the minimum temperature to kill Salmonella and variables, such as particular egg histories and sizes/grades, etc., as explained below, very significantly affect results. Thus, at 126° F., the results are so variable as to be unreliable, and to avoid the same, the yolk temperature must be at a higher value, i.e. at 128° F. or higher.

In this regard, experiments which attempted to establish the correlation line of FIG. 1 at between 128° F. and 126° F. showed the data for that correlation line to be so scattered that parameter lines A and B could not be established with any certainty. This reflects that at temperatures below 128° F. the above-mentioned variables become so significant that pasteurization while retaining functionality cannot be accurately predicted. Thus, for practical application of the invention, the central portion of the yolk must be at a temperature of 128° F. or higher.

This means, of course, that when a heat transfer medium as described above is used, that medium must be at a temperature of at least 128° F., since, otherwise, that heating medium would not be capable of heating the central portion of the yolk to at least 128° F. On the other hand, while the central portion of the yolk should not reach a temperature greater than about 138.5° F., the temperature of the heating medium can be higher than that temperature, since there will be a temperature differential between the temperature of the heating medium and the central portion of the yolk until an equilibrium temperature is established. However, it has also been found that a higher temperature of the heating medium should not be substantially greater than 138.5° F., since, otherwise, the chances of decreasing the functionality of the albumen before pasteurization occurs, especially near the shell, increases. For this reason, it is preferable that the medium is heated to temperatures no greater than 142° F.

The medium may be heated to more than one temperature during the pasteurization process. For example, the medium may be heated to a higher temperature of no greater than 142° F. for part of the pasteurization dwell time of the yolk, and then cooled to lower temperatures no less than 128° F. for the remainder of the portion of the dwell time of the yolk. There are certain advantages to heating to such higher temperatures and then cooling to such lower temperatures during the pasteurization process, in that the total time required for pasteurization is decreased. At the higher yolk temperatures, within parameter lines A and B of FIG. 1, the chances of decreased albumen functionality are increased. Therefore, in order to decrease processing time and the chances of decreased functionality, the heating medium may be heated to higher temperatures for part of the pasteurization and then heated to a lower temperature for the remaining part of the pasteurization, consistent, of course, with the yolk temperature being within the range specified above and within the dwell times of parameter lines A and B. If such different temperatures of the heating medium are used, it is preferable that the higher temperatures are between about 136° F. and 139° F. and the lower temperatures are between about 131° F. and 135° F.

The most preferred method in the foregoing regard is that of using one or more higher heating medium temperatures, e.g. 138° F., until the yolk temperature reaches a target value, e.g. 134° F., and then decreasing the temperature of the medium to that target temperature, e.g. 134° F., and maintaining that reduced medium temperature until the dwell time specified by FIG. 1 is reached. Several or more different medium temperatures may be used, so long as the resulting temperatures and dwell times of the yolk fall within parameter lines A and B of FIG. 1. This provides some latitude in fine adjustment of the process for optimum pasteurization and retention of functionality of the egg even with varying egg input and input egg conditions.

In this latter regard, a difficult problem in the prior art, where the eggs were processed by temperature control of the heating medium alone, e.g. a water bath, for specified time ranges, is that the particular input eggs and the prior handling conditions thereof could very substantially affect the results. For example, freshly laid eggs are normally stored in controlled temperature refrigerators until handling, processing, packaging and distribution are achieved, with the possible exception of grading. However, such conditions are not uniform, and the conditions vary from processor to processor. Thus, if eggs to be processed according to the prior art were stored at 41° F. and then placed in a heated water bath maintained at the prescribed temperatures and allowed to dwell therein for the prescribed time, the actual results that would be achieved thereby in terms of decrease in microorganisms and preserved functionality would vary significantly from that which would be achieved if the eggs had been stored at, for example, 44° F. Those results would vary most considerably if the eggs to be processed were brought to room temperature before processing. This is because the amount of heat required to be transferred into the egg to achieve reduction in microorganisms depends upon the temperature of the egg entering the process, e.g. entering the temperature-controlled hot water bath.

Likewise, the effects of specific dwell times in a water bath controlled at a specific temperatures will vary with the age of the egg. In addition, it will vary with the size, particular configuration, weight and density of the particular egg, which can vary somewhat. At least to some extent, the effects will vary with the particular breed of poultry used to produce the eggs.

All of these problems are obviated by the present method, where the control for pasteurization and retention of functionality is not in connection, specifically, with the temperature of the heat transfer medium, but is the result of the control of the temperature of the central portion of the yolk of the egg.

However, changes in functionality, especially of the albumen, can occur when the time required to reach the target yolk temperature within parameter lines A and B is overly long. This is referred to as the "come-up" time. The "come-up" time can be minimized by prewarming the eggs, e.g. to room temperature or up to about 120° F., prior to processing for pasteurization. It should be noted that any time during which the yolks of the eggs are within parameter lines A and B in reaching such target yolk temperature should be subtracted from the dwell time required by FIG. 1.

In regard to the "come-up" time, it was found that at yolk temperatures below 120° F., the growth rate of Salmonella is very low. Further, it was found that at yolk temperatures at 120° F. or below, protein denaturing (loss of functionality) also proceeds at a very low rate. With these two discoveries, it was found that eggs could be prewarmed to yolk temperatures up to 120° F. over relative long times without any significant increase in Salmonella or decrease in functionality. While the longer the prewarming time the greater the chance for loss of functionality and increase in Salmonella, prewarming periods of up to two hours, especially one hour and more especially up to 30 minutes are quite satisfactory. Such prewarming can considerably reduce the "come-up" time.

As noted above, the present method ensures that a Salmonella species, which may be present in the egg yolk, is reduced by at least 5 logs (base 10 log) while the albumen functionality of the egg, measured in Haugh units, is not substantially less than the albumen functionality of a corresponding unpasteurized in-shell egg. In this regard, it has been found that if a Salmonella species present in the egg is reduced in an amount by at least 5 logs, then any other pathogenic microorganism which may be expected to be in the egg will also be reduced by at least 5 logs, particularly, when the reduction of 5 logs is in connection with the species *Salmonella enteritidis*. *Salmonella enteritidis* is a particularly troublesome pathogenic species of Salmonella in that it is a more common species of infection in the yolk of the egg, for the reasons explained above, and is a particularly virulent pathogenic species. In addition, that species is more difficult to destroy because of its predominant yolk location and the corresponding difficulty to destroy while maintaining functionality. Therefore, if the process is designed and carried out so as to reduce *Salmonella enteritidis* by at least 5 logs, as essentially the worst case scenario, then it can be assured that other pathogens in the egg have been reduced sufficiently that the egg is safe for consumption by humans of ordinary health and condition.

In this regard, FIG. 1 is a graph of the temperature of the central portion of the yolk of an egg being pasteurized versus the log of the dwell time of the yolk at that temperature. That correlation is a straight line on log scale, and parameter lines A and B show permissible deviation from that correlation line, while still substantially ensuring a 5 log reduction in a Salmonella species, as well as a substantial retention of the albumen functionality. For optimum results, the dwell time at a specific temperature or dwell times at different temperatures, as explained above, should fall near that correlation line. However, as noted above, for some fine tuning of processes in connection with the particular egg input, the technical ability to control temperatures, and for shortening the process time, the time-temperature correlation can be within parameter lines A and B and satisfactory results will be obtained. However, it is much preferred that deviations from the correlation line be at longer dwell times, rather than at shorter dwell times, from the correlation line. This will ensure a 5 log reduction of Salmonella while still ensuring good functionality. Thus, the dwell times are within a 95% statistical confidence level for the straight line graph of temperature and log of dwell time (indicated in minutes), where one terminus of the line is at 128° F. for 215 minutes and the other terminus of the line is at 138.5° F. for 8.0 minutes. The 95% confidence level is calculated by standard statistical methods which are well known to the art and need not be described herein.

Thus, by carrying out the process so that the yolk is pasteurized in the above manner, this also ensures that the entire mass of the egg is likewise pasteurized such that there is at least a 5 log reduction of Salmonella species throughout the yolk, albumen and entire mass of the egg.

Newly proposed standards of the United States Food and Drug Administration (USFDA) require at least a 5 log reduction in Salmonella species for in-shell eggs to qualify as pasteurized. Acceptably retained functionality must also be achieved for practical commercial application. Heretofore, the art has not been able to meet that proposed standard. For example, only a 3 or 3.5 log reduction of a Salmonella species could be achieved by prior art processes, while reliably retaining the functionality of the in-shell eggs. As a result, some of the prior processes, instead, purported to use the USDA standard for liquid eggs (out-of-shell eggs). Those in-shell eggs are, nevertheless, not pasteurized eggs in that, while they may be safer to eat, they are not safe to eat.

As noted above, while the functionality of an egg can be determined by several or more tests, it has been found that the most sensitive and reliable test for determining retained functionality of eggs pasteurized by the present invention is that of the albumen functionality test. Since the yolk temperature is controlled according to the present invention, i.e. controlled at a temperature between 128° F. and 138.5° F., this, inherently, means that the albumen reaches a temperature of at least 128° F., but could for a portion of the time of the pasteurization process reach temperatures up to 138.5° F. or slightly higher when the temperature of the heat transfer medium is higher than 138.5° F., e.g. up to 142° F., as explained above. Therefore, these higher temperatures of the albumen, as opposed to the temperatures of the yolk, can cause loss of functionality of the albumen before there is a substantial loss of functionality of the yolk. By, therefore, controlling the yolk temperature, the functionality of the albumen is safeguarded so as to not be substantially reduced from that of an unpasteurized egg. Therefore, it can be ensured that the functionality of the whole egg including the yolk will not be substantially reduced in functionality.

As a very surprising and unexpected occurrence in connection with the present invention, when pasteurization is carried out very close to the correlation line of FIG. 1, not only is the albumen functionality not decreased but, in fact, quite surprisingly, is increased in some regards. The data actually shows that while a corresponding unpasteurized egg of Grade A quality may have an albumen functionality rating of between 60 and 72 Haugh units, when an egg is pasteurized close to the present correlation line of FIG. 1, the albumen functionality rises by up to 10 units, e.g. somewhere in the 70 or 80 units. It is noticed that there is a slight enlargement of the air sac and an enlargement of the yolk in such eggs, which enlargements are usually found in slightly older eggs. Even when operating the process close to either parameter line A or parameter line B, the albumen functionality of pasteurized Grade A eggs will still exceed 60 Haugh units.

In this latter regard, the term "corresponding unpasteurized in-shell egg" is defined to mean an egg of corresponding shape, weight, age, flock and processing history as that of the pasteurized egg, since, as explained above, these variables can effect the results of the process and, correspondingly, the results of the Haugh unit test. Therefore, in connection with the corresponding unpasteurized egg, the pasteurized egg is not substantially reduced in the albumen functionality test.

As is well known in the art, any substantial heating of egg protein causes some denaturization of that protein. In the prior art processes, while reduction of microorganisms in the eggs could easily be achieved, reduction of higher log cycles resulted in denaturing of the egg protein and a decrease in the functionality of the eggs to the extent that the eggs were not commercially useful for all purposes. In addition, that denaturing of the protein causes very substantial changes in the functionality of the eggs with storage. Thus, in those prior art processes, while freshly heat-treated eggs might not have acceptable functionality for all uses, they might have acceptable functionality for limited uses, e.g. producing a soft-boiled egg. However, with storage of the eggs, which is normal in the industry, even that functionality would substantially further decrease such that long time stored eggs would become unacceptable for almost all uses. Therefore, it is not only necessary to achieve pasteurization, while retaining functionality, as described above, but it is also necessary to retain that functionality over a significant period of time of storage of the eggs. Otherwise, without preservation of functionality during storage, the pasteurized eggs are simply not acceptable from a commercial point of view.

Storage affects both unpasteurized and pasteurized eggs (e.g. stored at 41° F). There is some weight loss during storage, the yolk height and width tend to change, yielding a changed yolk index and the whipped albumen height, in Haugh units, also tends to change in both types. These are, however, usually not practically significant. Generally speaking, eggs should not be stored (e.g. at 41° F.) for longer than about 75 days prior to use. In the prior art approaches, the processed eggs stored for up to 75 days showed unacceptable changes in egg functionality. For example, depending upon the prior art approach, the eggs could not make an acceptable sunny-side up fried egg, acceptable homogeneous scrambled eggs, or acceptable over-easy fried eggs. Neither could those eggs be used for making food products, such as salad dressings, e.g. Caesars salad dressing, mayonnaise, sponge cakes, cookies and other baking applications.

While the following example details the data of test results, that example shows that the present process not only destroys the Salmonella species so as to pasteurize the egg, i.e. at least a 5 log reduction, but does so without substantially adversely affecting the egg quality, e.g. functionality, even when stored up to 75 days at 41° F. Those eggs can be used for preparing sunny-side up, scrambled and over-easy cooked eggs, as well as in preparing salad dressings, mayonnaise, sponge cakes, cookies and other baking applications.

Thus, the present method and pasteurized eggs are further different from prior art methods and treated eggs in that the present pasteurized eggs have an egg weight substantially the same as a corresponding unpasteurized egg, a yolk index and yolk strength substantially the same as a corresponding unpasteurized egg, and an angel cake test and a sponge cake test substantially the same as a corresponding unpasteurized egg. Further, the present pasteurized eggs have frying, scrambling and boiling characteristics substantially the same as a corresponding unpasteurized egg, and, just as importantly, those characteristics are maintained in the present pasteurized eggs for up to 75-days storage at 41° F.

The egg produced by the method of the invention, as noted above, is a pasteurized in-shell chicken egg which comprises a pasteurized central portion of the yolk of the egg having at least a 5 log reduction of a Salmonella species which may be present in the egg in its unpasteurized form. The egg has an albumen functionality, measured in Haugh units, not substantially less than a corresponding unpasteurized in-shell egg. In this regard, "not substantially less" means that any differences are not of practical significance. The present pasteurized egg also has the reduction in Salmonella species throughout the yolk and albumen of the egg. Also, the egg weight, the yolk index, the yolk strength, the angel cake test, the sponge cake test, and frying, scrambling and boiling characteristics of the present pasteurized egg are not substantially less than a corresponding unpasteurized in-shell egg. Likewise, the present pasteurized egg can substantially maintain those characteristics for up to 75-days storage at 41° F.

It will be appreciated by those skilled in the art that a reduction in Salmonella species of at least 5 logs, while not substantially decreasing the albumen functionality, is a very substantial improvement in the art. Prior art approaches, such as those described above, under ideal conditions, could produce, perhaps, as much as a 3.5 log reduction in *Salmonella enteritidis* without substantially decreasing the albumen functionality. However, while up to a 3.5 log reduction will make the egg safer to eat, that egg is not pasteurized according to the proposed USFDA standard, discussed above, and, hence, cannot be said to be safely consumable by a human of normal health and condition. Unless at least a 5 log reduction is obtained, under the proposed USFDA standard, it cannot be assured that the egg can be safely consumed by such human. The present process is able to achieve that 5 log reduction, while maintaining the functionality of the egg, and, in this sense, has solved the dilemma which has plagued the art for some time. Indeed, by following closely the correlation line of FIG. 1, log reductions greater than 5 can be achieved, while substantially maintaining the functionality, e.g. 6 log reductions and even 7 log reductions, and this is a very substantial advance in the art.

While, as stated above, the method may be carried out by heating the eggs with any desired means, as also stated above, the preferred method is that of heating the eggs in an aqueous medium, preferably in a water bath, for the reasons set forth above, and this particular means of heating the eggs will be specifically discussed, for conciseness purposes, but it is to be understood that the invention is not limited thereto. It should be further understood that the specific method illustrated below is merely a preferred method when using a water bath as the heating medium, but that other methods may be used in connection with the use of a water bath as the heating medium, or in connection with other heat transfer media, so long as the yolk temperature/dwell time of the invention is observed.

In carrying out the method, it is necessary to control the yolk temperature of the egg. However, it is first greatly preferred to appropriately calibrate a particular apparatus and particular process conditions of that apparatus to ensure that the particular apparatus and conditions calibration results in the required yolk temperature/dwell time to pasteurize the eggs and retain functionality, according to FIG. 1. Thereafter, subsequent processing and pasteurization of eggs can be achieved by repeating those calibration process conditions without measuring the yolk temperature/dwell time of the eggs. For example, in such calibration, it may be established by temperature measurement of the yolk that when eggs stored at 41° F. are placed in a water bath at 137° F. for a particular apparatus with a particular agitation for 14 minutes and then removed and cooled in 41° F. storage, the yolk temperature/dwell time required by FIG. 1 is achieved. Thereafter, to effect pasteurization of succeeding lots of eggs, including the required yolk temperature/dwell time and retained functionality, it is only necessary to maintain that calibration agitation, water temperature, 14-minute dwell time, egg storage temperature and cooling temperature, to ensure that the yolk temperature/dwell time is that required by FIG. 1, without having to measure that yolk temperature/dwell time or functionality of succeeding lots of eggs. However, it is preferable that the calibration be periodically rechecked during processing of succeeding lots of eggs by checking the calibration with a lot of eggs from time to time by measuring the temperature of the yolk and measuring functionality.

To these ends, for a chosen lot of eggs being pasteurized, a statistical number of the eggs being processed will have a temperature probe inserted into that central portion of the yolk, and these eggs may be referred to as "control eggs". The temperature probe, e.g. thermocouple, is inserted into the egg, in a manner well known in the art, and sealed thereagainst by conventional manners, e.g. glues, waxes, putties, and the like, to prevent water from entering the egg during processing. The temperature of the central portion of the control egg yolks is monitored by the temperature probe, and the yolk temperature/dwell time is determined and controlled to ensure that the values fall within parameter lines A and B of FIG. 1. If so, the calibration has been obtained or maintained; if not, adjustment of operating conditions and recalibration are required.

Whether in regard to such calibration or in regard to production pasteurization of eggs, normally, eggs of essentially the same size range will be processed as a lot. Otherwise, with eggs of greatly different sizes, the calibration or production processing could not ensure pasteurization. The sizes may be determined by weight, and, for example, eggs of a target weight plus or minus 10% are processed as a lot.

In the method of the invention, a lot of eggs is placed in a conventional pasteurization apparatus, which may be any conventional pasteurization apparatus, such as a cheese vat, and heated water is introduced into that vat with the water being heated to at least 128° F. and up to 142° F., but preferably less than 138.5° F. The temperature of the central portion of the egg yolk of a statistical number of eggs is monitored by a temperature probe present in "control" eggs as a periodic or continual recheck of calibration, as explained above, or as the primary means of control of egg yolk temperature, e.g. in an apparatus which has not been calibrated as described above. Preferably, however, the apparatus has been calibrated, and such control eggs are not required or are used only periodically to recheck calibration. When the desired target temperature of the yolk, e.g. 134° F. is reached, the temperature of the water is controlled to maintain that target temperature by adding cold or hot water as required, and that yolk temperature is controlled for the time set by the correlation line of FIG. 1 or at least within parameter lines A and B.

After the eggs have reached that temperature and been controlled at that temperature for the time of the correlation line, the eggs are removed from the pasteurizer and cooled to at least below 126° F., and more preferably below 115° F., and yet more preferably below 100° F. This cooling should be as rapid as possible such that residual temperatures in the eggs do not substantially further denature protein beyond that achieved at the correlation temperature. Usual cooling procedure, e.g. air, is sufficient for this purpose, but it is preferable to cool the eggs in cool water or in normal storage, e.g 41° F., after removal from the pasteurizer. It should be noted that any time during which the yolks of the eggs remain within parameter lines A and B during cooling should be subtracted from the dwell time required by FIG. 1. After the eggs have been so cooled, the eggs are then dried, e.g. air drying, packaged and transferred to a cold storage, maintained at an acceptable temperature of between 38° F. and 45° F., e.g. 41° F., and are then ready for distribution.

In addition, for calibration, recheck of calibration or primary control of the pasteurization, a statistical number of "control" eggs may be analyzed for functionality. While the functionality will be largely known by the albumen functionality test, in Haugh units, to ensure that the functionality of the pasteurized egg is substantially the same as a corresponding unpasteurized egg, in addition to the albumen functionality, "control" eggs may be examined for egg weight, yolk index and yolk strength, angel cake test and sponge cake test, as well as the characteristics of frying, scrambling and boiling, as described above.

All of the control eggs, i.e. yolk temperature and functionality control eggs, are essentially part of calibration for a particular pasteurizing apparatus operated at particular conditions with particular eggs. This is because particular pasteurizing apparatuses can vary in their performance of pasteurization, and any particular apparatus must be calibrated to ensure that the yolk temperature/dwell time reaches the desired results required by FIG. 1. However, as noted above, once calibrated, for successive pasteurizations of substantially the same eggs, then it is no longer necessary to use the temperature probed "control" eggs or to perform the functionality tests mentioned above, since by repeating the calibration process, the same results will be achieved. This is, of course, based on the assumption that all succeeding lots of eggs processed in that same manner have essentially the same histories and conditions, as described above. If the histories or conditions change markedly, then the apparatus must be recalibrated, as discussed above.

Optionally, the pasteurized eggs may be protected from environmental recontamination by wrapping the eggs or cartons of eggs in a protective barrier, such as a plastic film. Heat shrinkable plastic film is particularly well suited to this purpose, such as the heat shrinkable films made by the Cryovac Division of W. R. Grace & Co. These films are co-extruded polyolefin films, some of which are cross-linked. These films are generally referred to as "industrial food source films" and particularly useful are those films designed as D-955 and MPD 2055. It is to be understood, however, that pasteurization of eggs, similar to pasteurization of milk, does not extend the shelf life of the eggs nor does it lessen the necessity for proper handling and cooling of the eggs, in the same manner as pasteurized milk. Accordingly, simply wrapping each individual egg or package of eggs will not extend the shelf life of the eggs.

The invention will now be illustrated by the following example, where all percentages and parts are by weight, unless otherwise indicated.

EXAMPLE

This example illustrates two different protocols for pasteurizing eggs.

In a manner described above in connection with the method of calibrating a particular apparatus/process conditions, the graph of FIG. 1 was experimentally determined by inoculating a statistical number of eggs with *Salmonella enteritidis*. The inoculated eggs were sealed in the same manner as sealing the temperature probe of the "control" eggs. These "control" inoculated eggs were processed in the same manner. The "control" inoculated eggs were examined for *Salmonella enteritidis* log reduction by standard microbiological techniques. The graph of FIG. 1 was then constructed on the basis of yolk temperature/dwell time which would achieve at least a 5 log reduction in *Salmonella enteritidis*. Parameter lines A and B show a 95% confidence level. Retained functionality was confirmed by the same procedure described below.

Thus, it was known by this experimental data that by processing eggs within parameter lines A and B of FIG. 1, a 5 log reduction in a Salmonella species resulted while maintaining functionality. This Example, therefore, illustrates that retained functionality and further illustrates that retained functionality during long-term storage, i.e. at 41° F. for up to 75-days storage.

The pasteurizer used in this example was a Kusel (Kusel Equipment Co., Watertown, Wis.). It has a 100 gallon capacity and is usually used as a cheese vat. The vat is filled with water and heated to the target temperature with a steam jacket. The vat is equipped with a Nonox steam/water mixer and that target temperature is maintained by flowing temperature controlled water into the vat with a corresponding outflow of water. For temperature control, the vat is equipped with mountings for separate temperature probes to monitor the water temperature. In this example, the water temperature was monitored using three Type T 24 gauge (copper-constantan Teflon-coated) thermocouples connected to a Cole-Palmer (Niles, Ill.) Dual Input Thermocouple Thermometers (Model No. 08112-20). The thermocouples were placed at three different locations and at three different water levels throughout the vat to monitor the evenness of water temperature.

Thirty-six eggs were used in each test and were placed in conventional filler flats at 12 inches below the water level. Each batch of test eggs also contained three eggs that were probed with a thermocouple. The thermocouple was inserted 1¾ inches into the large end of the eggs to the central portion of the yolks. The eggs were sealed with a gel-based glue and allowed to dry. Temperatures of the eggs and water vat were monitored at one minute intervals with an accuracy of ±0.2° F. Mild agitation was carried out in the vat and was regulated using a rotary stainless steel impeller pump with a 1½ inch inlet and a 1½ inch outlet.

Approximately 4-day old eggs were used for each of the tests, and the eggs were large Grade A quality eggs from the same flock. The eggs had been stored at 41° F. until processed. The eggs were removed from the storage cooler and placed into the plastic filler flats. The three eggs with the thermocouples mounted therein were also included in each flat. The filler flat was then placed in the preheated vat, and the temperatures of the water and the egg yolk temperatures were recorded at one minute intervals.

In one protocol, when the average internal yolk temperature of the three eggs reached 134° F., cool water was added to the vat and mixed, as needed, to maintain that internal yolk temperature. In the other protocol, the cool water was added when the average internal temperature of the yolk reached 133° F. Both of the protocol fall within parameter lines A and B of FIG. 1.

After processing, the eggs were removed from the water vat and placed directly into a 41° F. cooler, by which they were rapidly cooled.

No pasteurized eggs were removed from the cooler until after the average internal yolk temperature reached 41° F. The various batches for each treatment were combined and randomly assigned to Day 0, 10, 20, 30, 60 or 75 days storage.

Treatment of the eggs were assigned treatment numbers as follows:

1. Treatment No. 1—a control group of unpasteurized eggs;
2. Treatment No. 2—a control group of unpasteurized eggs which were placed in a Cryovac package (film);
3. Treatment No. 3—pasteurized eggs, initial water bath temperature of 137° F. and average internal yolk temperature of 133° F.;
4. Treatment No. 4—pasteurized eggs, initial water bath temperature of 137° F. and average internal yolk temperature of 133° F., packaged within a Cryovac package;
5. Treatment No. 5—pasteurized eggs, initial water bath temperature of 138° F. and average internal yolk temperature of 134° F.; and
6. Treatment No. 6—pasteurized eggs, initial water bath temperature of 138° F. and average internal yolk temperature of 134° F., packaged within a Cryovac package.

Treatment Nos. 2, 4 and 6 were packaged in groups of six in cardboard or plastic filler flats. The packaging was provided by Cryovac and consisted of a plastic sleeve into which the eggs were placed and then sealed using a bar sealer. The plastic sleeve was made of Cryovac D-955 film.

A description of the tests of the various treatments at day intervals is set forth in Table 1 below.

TABLE 1

| Day | Treatment | Tests | |
|---|---|---|---|
| 0 | #1, #3, #5 | Egg Quality - | Weight |
|  |  |  | Yolk Index |
|  |  |  | Haugh Units |
|  |  | Yolk Strength | |
|  |  | Foam Stability | |
|  |  | Angel Cake Volume | |
|  |  | Sponge Cake Volume | |
|  |  | Whip Test | |
|  |  | Lysozyme Activity | |
| 10 & 20 | #1, #2, #3, #4, #5, #6 | Egg Quality - | Weight |
|  |  |  | Yolk Index |
|  |  |  | Haugh Units |
|  |  | Yolk Strength | |
| 30, 60 & 75 | #1, #2, #3, #4, #5, #6 | Egg Quality - | Weight |
|  |  |  | Yolk Index |
|  |  |  | Haugh Units |
|  |  | Yolk Strength | |
|  |  | Foam Stability | |
|  |  | Angel Cake Volume | |
|  |  | Sponge Cake Volume | |
|  |  | Whip Test | |
|  |  | Lysozyme Activity | |

A. Egg Quality Tests

1. Egg Weight—Initial and final egg weights (to one hundredth of a gram) were recorded to determine if a weight gain or loss occurred during processing or storage.

2. Yolk Index—Yolk index is a measure of yolk quality. A decreasing yolk index indicates a lower yolk quality.

$$\text{Yolk index} = \frac{\text{Yolk height (mm)}}{\text{Yolk width (mm)}}$$

3. Haugh Units (Albumen Functionality Test)—The Haugh units measure albumen (egg white) quality. As the egg ages, the thick white thins. The Haugh units are calculated using both the egg weight and the height of the thick albumen. Standard Haugh unit values for different grades of eggs are as follows:

| | |
|---|---|
| Grade AA | >72 Haugh units |
| Grade A | 60–72 Haugh units |
| Grade B | <60 Haugh units |

4. Yolk Strenqth—Yolk strength is a measure of how easily the yolk will break when dropped from a distance of 6 inches onto a flat surface.

B. Properties Tests:
1. Angel Cake Volume—Angel cake volume is a sensitive test of egg white protein damage. Generally, heat damage will greatly increase whipping time and decrease the cake volume.
2. Sponge Cake Volume—Measures both foaming volume and emulsification properties. The yolk proteins are less heat sensitive than egg white proteins. Sponge cake volume provides a measure of the effect of heat processing on yolk functionality.
3. Foaming Stability—Measures the foaming efficiency of egg whites. The foaming properties of egg whites are provided by certain egg white proteins. These proteins are particularly sensitive and may be damaged by heat processing. If proteins are damaged, then foam volume will decrease and the liquid drainage from the whipped foam will increase. The egg whites are whipped to a specific gravity of 0.1. Percent drainage was calculated by dividing the grams of drainage by the initial weight of the foam.
4. Whip Test—This is another measure of the foaming efficiency of egg whites. Egg whites are whipped for a specific time and speed and the height of the foam is then measured.

All functionality tests were performed in triplicate per treatment.

C. Other Tests:
1. Lysozyme Test—This test measures the enzyme activity. Lysozyme is one of the constituents in eggs which provides some antibacterial activity. It acts upon gram positive organisms. Rate of clearing was determined per minute at the most linear portion of the curve, i.e. between 0.5–3.0 minutes.

Results and Observations of Eggs at Day 0

Visual Observations

Observations were conducted on eggs from Treatment Nos. 1, 3 and 5. Treatment No. 1 (unpasteurized eggs) showed no signs of cloudiness, and the yolk shape was normal. Treatment No. 3, pasteurized with an initial water bath temperature of 137° F. and a yolk temperature of 133° F. (137–133° F.) showed cloudiness in the thick and thin albumen. The yolk was slightly flatter than in Treatment No. 1. Treatment No. 5 (138–134° F.) was very similar in appearance to Treatment No. 3, with the exception of a slight decrease in cloudiness in the thin albumen.

Egg Quality

Weight Loss—No statistically significant (p>0.05) differences in weight loss occurred between the control and pasteurized eggs at Day 0. A statistically significant (p<0.05) difference was found between the pasteurized eggs, with the eggs from Treatment No. 3 (137–133° F.) losing the least amount of weight.

Yolk Index—No statistically significant (p>0.05) differences in yolk index occurred between Treatment Nos. 1, 3 and 5.

Yolk Strength—Pasteurization did not statistically significantly (p>0.05) affect yolk strength.

Haugh Units—No statistically significant (p>0.05) differences in Haugh units occurred between Treatment Nos. 1, 3 and 5.

Properties Test

Angel Cake Volume—Differences in angel cake volume between all three treatments were not statistically significant (p>0.05). However, whipping time to achieve a medium peak was increased in the pasteurized eggs compared to the control eggs.

Sponge Cake Volume—Significant (p<0.05) differences were found in sponge cake volume between Treatment Nos. 3 and 5, with Treatment No. 3 having greater cake volume. There was not a statistically significant (p>0.05) difference in sponge cake volume between the control and pasteurized eggs.

Whip Test—Whip test results indicated a statistically significant (p<0.05) difference between the control and pasteurized eggs with the control eggs having the least amount of drainage and the greatest foam volume. There was no statistically significant (p>0.05) difference between Treatment Nos. 3 and 5. To achieve a specific gravity of 0.1 in the control eggs, the whipping time was 30 seconds compared to 3 minutes for the pasteurized eggs.

Other Tests

Lysozyme—A statistically significant (p<0.05) difference in lysozyme activity was found between the control and pasteurized eggs. Differences in enzyme activity between Treatment Nos. 3 and 5 were not statistically significant (p>0.05).

Conclusion

At Day 0, the pasteurized eggs exhibited some cloudiness in the thick albumen (white) as compared to unpasteurized eggs. The degree of cloudiness is not practically significant.

A small amount of weight was lost during the pasteurization process but was comparable to average weight loss in the unpasteurized eggs. No weight gain occurred during pasteurization. The pasteurization process did not practically significantly adversely affect the yolk index, Haugh units, or yolk strength. After pasteurization, the eggs remained large Grade A quality eggs.

Pasteurization did not practically significantly affect angel and sponge cake volume when comparing to the unpasteurized egg. However, Treatment No. 3 (137–133° F.) had a greater sponge cake volume than Treatment No. 5 (138–134° F.), which was found to be significant.

Unpasteurized eggs were slightly superior in foam volume and foam stability as compared to the pasteurized eggs, but this superiority is not practically significant.

Lysozyme activity decreased in the pasteurized eggs as compared to the unpasteurized eggs. However, the loss in activity is of little practical significance.

Results and Observations of Eggs at Day 10

At Day 10, the results were similar to Day 0 in regard to the common tests. Cloudiness was apparent in the pasteurized eggs compared to the unpasteurized eggs. The degree of cloudiness is not practically significant. No visual differences were observed between the packaged and unpackaged eggs.

Some degree of weight loss occurred in all treatments during the 10-day storage period. Packaging did not significantly affect the amount of weight loss.

A statistically significant difference was found in yolk index between the pasteurized and unpasteurized eggs and the packaged and unpackaged eggs. Haugh units were not affected by the pasteurization process. Unpackaged eggs had higher Haugh units as well as eggs from Treatment Nos. 5 and 6. The differences in the yolk index and Haugh units are not practically significant and do not affect the quality of the eggs. The eggs were still large Grade A quality eggs.

Results and Observations of Eggs at Day 20

At Day 20, the results were similar to Day 10 in regard to the common tests. The pasteurized eggs at Day 20 were still cloudy in appearance as compared to the unpasteurized eggs. Some cloudiness also appeared in the thin albumen. The degree of cloudiness is not practically significant. Packaging did not affect the visual appearance of the eggs.

All treatments lost weight at Day 20 of storage. Packaging did decrease the amount of weight loss as compared to the unpackaged eggs. The unpasteurized eggs lost less weight compared to the pasteurized eggs. The amount of weight loss is not practically significant and would not change the grade designation.

The unpasteurized eggs had a slightly higher yolk index. Packaging did not affect yolk index. No practical significant differences in Haugh units or yolk strength were apparent between all treatments. At the end of 20-days storage, all eggs were still large Grade A quality eggs.

Results and observations of Eggs at Day 30

At Day 30, the results were similar to Day 20 in regard to the common tests. Cloudiness in the thick albumen and slight cloudiness in the thin albumen were present in the pasteurized eggs. The pasteurized eggs were also slightly more runny in the outer thin albumen than unpasteurized eggs. No differences between the packaged and unpackaged eggs were apparent. The degree of cloudiness and runniness is not, practically significant.

Weight loss occurred in all treatments, with the unpasteurized eggs losing the least amount of weight. Packaging did not have a significant effect on weight loss. Unpackaged eggs had a higher yolk index than those that were packaged. Packaging and pasteurization did not have a significant effect on yolk strength or Haugh units. The eggs still remained large Grade A quality eggs after 30 days of storage.

Angel cake and sponge cake volume was not affected in all treatments at Day 30. Longer whipping times were necessary for the pasteurized eggs. Packaged and pasteurized eggs had a greater sponge cake volume but were not practically superior to the other treatments.

Foam stability and volume were greatest in the unpasteurized eggs. Longer whipping times were necessary in the pasteurized eggs. Loss of lysozyme activity occurred in all treatments; however, the loss in activity is of little practical significance. None of these differences were of practical significance.

Results and Observations of Eggs at Day 60

At Day 60, the results were similar to Day 30. The cloudiness of the thick albumen and slight cloudiness in the thin albumen of the pasteurized eggs were observed. Packaging did not play a significant role in appearance. The outer thin albumen of pasteurized eggs was slightly more runny than the unpasteurized eggs. The degree of cloudiness and runniness of the pasteurized eggs is not practically significant.

Weight loss occurred in all treatments but was not significantly affected by packaging or heat treatments. Weight loss was not significant enough to change the classification of the eggs.

Yolk strength and yolk index were not affected by pasteurization or packaging. Haugh units were greater in pasteurized eggs than unpasteurized eggs. At the end of 60-days storage, all treated eggs were still large Grade A quality eggs.

Unpasteurized eggs had greater angel and sponge cake volume. Packaging did not play a significant role in cake volume. Foam stability and volume were greater in the unpasteurized eggs. Longer whipping times were needed for the pasteurized eggs. None of these differences were practically significant.

Lysozyme activity was lost in all treatments but was not practically significant.

Results and Observations of Eggs at Day 75

At Day 75, the results were similar to Day 60. The pasteurized egg albumen was more cloudy than that of unpasteurized eggs. The degree of cloudiness is not practically significant. Runniness was more apparent in the outer thin albumen. Packaging did not appear to make a significant difference in egg quality.

Weight loss occurred in all treatments, with the packaged eggs losing the least amount of weight. Yolk index was better in the unpasteurized eggs. Yolk strength was not significantly affected by pasteurization or packaging. Haugh units were greater in the pasteurized eggs than in the unpasteurized eggs. However, at the end of Day 75, all treatments were still large Grade A quality.

Angel cake volume was not significantly affected by pasteurization or packaging. Unpasteurized and unpackaged eggs had the greater sponge cake volume. None of these differences are of practical significance.

Foam stability and volume were superior in the unpasteurized eggs compared to pasteurized eggs. Longer whipping times were required for the pasteurized eggs. None of these differences were of practical significance.

Lysozyme activity decreased in all treatments after 75 days of storage, but not enough to cause a practical significant effect.

Overall Conclusion

Cloudiness of the thick albumen occurs in pasteurized eggs that is not apparent in the unpasteurized eggs. However, the degree of cloudiness is not practically significant. Cloudiness remained essentially constant during the 75-day test period and is similar to the natural cloudiness of two-day old eggs.

Weight loss statistically significantly ($p<0.05$) increased during storage for all treatments. Packaging statistically significantly ($p<0.05$) reduced weight loss of all three treatment groups. Pasteurized eggs were noted to have statistically significantly ($p<0.05$) more weight loss as compared to unpasteurized eggs. None of these differences, however, are of practical significance.

Yolk index of the control eggs was found to be statistically significantly ($p<0.05$) better than the pasteurized eggs for most of the storage periods. Yolk index statistically significantly (p<0.05) declined in all groups up to 60 days. All treatments exhibited an increase in yolk index at 75 days, which resulted in a statistically significant (p<0.05) day by treatment interaction. This increase is, however, not practically significant.

The yolk breakage test indicated that yolk breakage was satisfactory in all groups throughout the storage study.

Haugh units of pasteurized eggs were observed to be statistically significantly (p<0.05) higher than the control eggs. This was particularly true at longer storage periods (beyond 30 days). Packaging statistically significantly (p<0.05) improved the Haugh units of all treatment groups.

Angel cake volume was found to be variable. Control eggs were found to have a statistically significantly (p<0.05) better angel cake volume. Whip foam volume and foam stability were statistically significantly (p<0.05) superior in control eggs as compared to pasteurized eggs. None of these differences are, however, practically significant.

Sponge cake volume was statistically significantly (p<0.05) better in pasteurized eggs up to 30 days as compared to control eggs. After 30 days, the control group eggs were noted to have statistically significantly (p<0.05) better sponge cake volume. The 137° F. treatment groups eggs were found to have a statistically significantly (p<0.05) better sponge cake volume as compared to the 138° F. treatment group. Although sponge cake volume was variable and declined through storage, the sponge cake volume was acceptable in all tests, and the differences are not practically significant.

Lysozyme activity statistically significantly (p<0.05) declined in all treatment groups throughout storage. Pasteurization also statistically significantly (p<0.05) reduced lysozyme activity. Previous research has shown that lysozyme activity in shell eggs will decrease during storage. Although lysozyme activity was lower in pasteurized eggs, this difference is not practically significant.

The pasteurized eggs are suitable for all forms of food preparation. They can be prepared sunny-side up, scrambled and over-easy. The pasteurized eggs can also be utilized in salad dressings (e.g. Caesars salad), mayonnaise, sponge cakes, cookies and other baking applications.

Thus, overall, there was no practical significant difference in functionality of the pasteurized eggs as compared with corresponding unpasteurized eggs for the entire storage period.

| Test Details Sponge Cake Test | |
|---|---|
| Ingredients: | 50.0 g cake flour |
| | 46.25 g sucrose |
| | 19.30 g dextrose |
| | 5.0 g nonfat dry milk |
| | 1.25 g salt |
| | 2.50 g baking powder |
| | 29.49 g whole egg |
| | 18.90 g water (first addition) |
| | 10.26 g water (second addition) |

Procedure:
1. Preheat oven to 375° F.
2. Allow all ingredients to come to room temperature.
3. Sift all dry ingredients.
4. Blend all dry ingredients for one minute on the stir speed of a Kitchen Aid Mixer (Model K4-B).
5. Add egg to mixture.
6. Mix for 1 minute at speed 2 while slowly adding the first water.
7. Scrape down sides of bowl.
8. Mix for 2 minutes at speed 8.
9. Mix for 2 minutes at speed 4, while slowly adding the second water.
10. Scrape down sides of bowl.
11. Mix 2 minutes at speed 8.
12. Measure out 150 g into a tared 5.5"×3.5"×2.75" baking pan. (Two 1" strips of wax paper placed lengthwise along the bottom of the pan, extended over the ends to facilitate removal of the cake from the pan.)
13. Bake in reel-oven for 30 minutes.
14. After baking, allow to cool for 10 minutes, and remove from pan.
15. Volume determinations are made with a rape seed displacement method. Record initial volume of rape seeds. Turn mechanism over and add cake. Invert mechanism to allow rape seeds to surround cake and record final volume.
16. Report results as $cm^3$.

| Angel Cake Test | |
|---|---|
| Ingredients: | 90.0 ml blended egg white |
| | 1.8 g salt-cream of tartar mixture |
| | (0.45 g salt, 1.35 g cream of tartar) |
| | 69.0 g super-fine sugar |
| | 56.0 g flour-sugar mixture |
| | (23.0 g sugar, 33.0 g flour) |

Procedure:
1. Preheat oven to 390° F.
2. Warm Kitchen Aid Mixer (Model K4-B) by letting it run at speed 10 for 15 minutes.
3. Sift twice, separately:
   56.0 g flour-sugar mixture
   69.0 g sugar
   1.8 g salt-cream of tartar mixture
4. Place 90.0 ml blended egg white in a bowl, sift salt-cream of tartar mixture over egg white.
5. With mixer set on speed 10, white to a medium peak.
6. Sift 69.0 g super-fine sugar over foam in three increasingly larger portions and whip at speed 6 for 4 seconds after each addition.
7. Sift 56.0 g of flour-sugar mixture onto foam in 3 portions, folding after each addition. Use a wire whip and about 20 strokes.
8. Weight out 120 g of the batter into a tared 5.5"×3.5"×2.75" pan (two 1" strips of wax paper placed lengthwise along the bottom of the pan, extended over the ends to facilitate removal of the cake from the pan) with perpendicular sides. Place in reel oven for 20 minutes.
9. Remove from the oven and place in an inverted position on a cooling rack.
10. After 24 hours, measure and record cake volume, using the rape seed displacement method. Record initial volume of rape seeds. Turn mechanism over and add cake. Invert mechanism to allow rape seeds to surround cake and record final volume.
11. Report results as $cm^3$.

Foaming Stability Test

Procedure:
1. Weigh out 50 gram sample of room temperature egg white. Place in mixing bowl (Kitchen Aid Mixer, Model K4-B). Add 10 ml of distilled water.
2. Begin timing and whip at high speed (speed 10) until the foam has a specific gravity of approximately 0.1. Specific gravity determination: density determination is substituted, tare a container of known volume, fill, level and weigh. Density is determined by:

$$\frac{\text{Weight in grams}}{\text{Volume in ml}} = \text{Density}$$

The whipping time for this stage to be reached is noted.
3. Transfer the foam to a tared glass funnel and immediately record weight of the foam.
4. Cover the funnel with a large petri plate and allow to drain into a graduated cylinder tared on a scale.
5. Record weight of drainage at 15 minute intervals for 1 hour.

Calculation: Calculate grams of drainage per 100 grams of foam from the total weight of foam and the weight of drainage by:

$$\frac{\text{Grams of Drainage}}{\text{Grams of foam}} \times 100 = \% \text{ Drainage}$$

Whipping Test

Procedure:
1. Weigh out 50 gram sample of room temperature egg white. Place into mixing bowl (Kitchen Aid Mixer, Model K4-B).
2. Mix for 90 seconds on speed 2.
3. Mix for 90 seconds on speed 10.
4. Transfer foam from bowl into 600 ml beaker. Level foam and measure depth of foam.
5. Record results in cm.

Lysozyme Assay

Reagents:

0.0667M Sodium Phosphate Monobasic:

Dissolve 9.218 g NaH$_2$(PO$_4$) H$_2$O and bring to 1 L final volume.
0.0067M Sodium Phosphate Dibasic:

Dissolve 9.48 g Na$_2$HPO$_4$ and bring to 1 L final volume.
M/15 Phosphate Buffer pH 6.2:

Mix portions of 0.0667M Sodium Phosphate Mono and Dibasic solutions together until a pH 6.2 is reached. About 300 ml of dibasic to 1 L monobasic.
50 mg % Suspension of U.V. Killed and Lyophilized Micrococcus Lysodeikticus:

Dissolve 0.5 g in M/15 phosphate buffer pH 6.2 and bring to 1 L final volume. Keep refrigerated at 4° C.

Procedure:

Allow preblended egg white samples and cell suspension to come to room temperature. Use plastic as lysozyme adheres to glass.

Dilute egg white samples to give a moderate clearing rate. Add 0.02 ml of egg white to 0.98 ml buffer, gives a theoretical lysozyme concentration of 70 ug/ml, the limits of this assay are 0.1 to 10 ug (per 2.9 ml substrate) of active lysozyme.

Using the kinetics software package on a Beckman Spectrophotometer, edit program to the following:

| | |
|---|---|
| Wavelength = | 450 nm |
| Tabulate = | 1.0 (yes) |
| Int Time = | 3.00 sec |
| Total Time = | 8.00 min |
| Plot = | 1.0 |
| Span = | 0 |
| Slope = | 1 |
| Results = | 1 |
| Factor = | 1.000 |

Calibrate using 2.9 ml of cell suspension.

Place cuvette containing 2.9 ml of 50 mg % cell suspension into cell holder in spectrophotometer. Add 0.1 ml of diluted egg white and immediately mix using a plastic pasteur pipet. Allow program to run.

Maximum velocity will be extrapolated from the most linear portion of the curve by the software package. Factors used are 2–8 min., 2–4 min, 3–8 min., and 0.5–3 minutes. Rate reported per minute by software.

Report as delta abs (at 450 nm)/min. per g sample/2.9 ml substrate at 22° C. (room temperature).

From the above example, it can be seen that the invention provides a method for, and a pasteurized egg resulting therefrom, reducing a Salmonella species that may be present in eggs by at least 5 logs, while at the same time does not substantially practically decrease the functionality of the pasteurized egg. This is a most significant advance in the art. From the foregoing, it will be understood that the term "pasteurized" in connection with the present invention means that a Salmonella species which may be present in a chicken egg is reduced by at least 5 logs, the pasteurized egg is safe for consumption by humans of ordinary health and condition, and the functionality of the egg, measured in Haugh units, is not substantially less than that of a corresponding unpasteurized chicken egg. In this latter regard, the term "substantially less" does not mean there is no statistically significant difference, but means that there is no practical difference in terms of usual uses of the eggs, e.g. in baking, cooking, frying, boiling, poaching, scrambling, etc. The specification and claims should thus be so construed.

It also should be understood that the invention is not limited to the foregoing embodiments, but extends to the spirit and scope of the annexed claims.

What is claimed is:

1. A method of pasteurizing an in-shell chicken egg, comprising the following steps providing a fluid heat transfer medium;

calibrating a temperature of said fluid heat transfer medium which will heat the egg until a temperature of a central portion of a yolk of the egg is within a predetermined range sufficient that a Salmonella species present in the egg yolk is reduced in amount by at least 5 logs but insufficient that an albumen functionality of the egg measured in Haugh units is substantially less than the albumen functionality of a corresponding unpasteurized in-shell chicken egg; and placing the egg and the fluid heat transfer medium into contact with one another for times sufficient to maintain the temperature of the central portion of the yolk within parameter line A and parameter line B of FIG. 1.

2. The method of claim 1, wherein said step of calibrating comprises the steps of:

provyding a test egg;

placing a temperature measuring device inside of the central portion of the yolk of the test egg;

placing the test egg and the fluid heat transfer medium into contact with one another; and measuring the temperature of the yolk over a predetermined period of time.

3. The method of claim 2, wherein said step of measuring the temperature of the yolk includes the step of taking intermittent temperature readings of the yolk over said predetermined period of time.

4. The method of claim 3, wherein said step of calibrating further comprises the step of adjusting the temperature of the fluid heat transfer medium so that the temperature of a central portion of the yolk of the test egg is within said predetermined range.

5. A method of calibrating an in-shell chicken egg pasteurizing device, comprising the following steps:

providing a control egg;

placing a temperature measuring device inside of a central portion of the yolk of the control egg:

providing a fluid heat transfer medium at a substantially fixed temperature;

placing the control egg and the fluid heat transfer medium into contact with one another;

measuring the temperature of the yolk of the control egg over a predetermined period of time;

determining a temperature of said fluid heat transfer medium which will heat the control egg until a temperature of a central portion of a yolk of the control egg is within a predetermined range for times within parameter line A and parameter line B of FIG. 1;

providing said control egg with a Salmonella species in the yolk thereof; and determining said temperature of said fluid heat transfer medium to be sufficient that a Salmonella species present in the yolk of the control egg is reduced in amount by at least 5 logs but insufficient that an albumen functionality of the control egg measured in Haugh units is substantially less than the albumen functionality of a corresponding unpasteurized in-shell chicken egg.

\* \* \* \* \*